United States Patent [19]

Scott et al.

[11] Patent Number: 4,875,399
[45] Date of Patent: Oct. 24, 1989

[54] MITER BOX ATTACHMENT FOR CUTTING CROWN MOULDINGS AND THE LIKE

[76] Inventors: William D. Scott, 10795 Dalzell, Traverse City, Mich. 49684; James J. Swartout, 5663 County Rd. 616 E., Cedar, Mich. 49621

[21] Appl. No.: 210,571

[22] Filed: Jun. 23, 1988

[51] Int. Cl.⁴ .......................... B27B 27/06; B23Q 3/00
[52] U.S. Cl. .................................. 83/468.3; 83/471.3; 83/581; 269/303
[58] Field of Search ................. 83/467 R, 467 A, 468, 83/522, 471.2, 471.3, 473, 477, 477.2, 581, 761-767, 391, 698-700; 269/303, 304, 315; 403/62, 53, 100, 102; 74/813 L; 24/514, 569; 248/316.4

[56] References Cited

U.S. PATENT DOCUMENTS

| 112,861 | 3/1871 | Sprague | 83/468 |
| 346,240 | 7/1886 | Soukup | 83/763 |
| 415,940 | 11/1889 | Davis | 83/767 |
| 544,092 | 8/1895 | Goodell | 83/767 X |
| 752,406 | 2/1904 | Nichols | 83/766 |
| 1,745,099 | 1/1930 | Kasper | 83/761 |
| 3,397,722 | 8/1968 | Long | 83/762 |
| 4,452,117 | 6/1984 | Brickner et al. | 83/467 R |
| 4,694,720 | 9/1987 | Brickner Jr. et al. | 83/471.3 |

OTHER PUBLICATIONS

"10"Motorized Miter Box Instruction Manual" Published by Delta International Machinery Corp. of Memphis, Tenn. (dated Aug. 15, 1987).

Primary Examiner—Frank T. Yost
Assistant Examiner—Eugenia A. Jones
Attorney, Agent, or Firm—Warner, Norcross & Judd

[57] ABSTRACT

The specification discloses a jig for a motorized miter box enabling the easy and accurate cutting of compound miters. A pair of the jigs is slidably mounted on opposite lateral edges of the table to be movable toward and away from the fence. The jig includes a registration block which is movable between a position on the table and a position clear of the table. When on the table, the registration blocks support a workpiece in a cocked position against the fence for cutting of the compound miter. When clear of the table, the registration blocks do not interfere with a piece of wood laying on the table or extending therefrom.

16 Claims, 2 Drawing Sheets

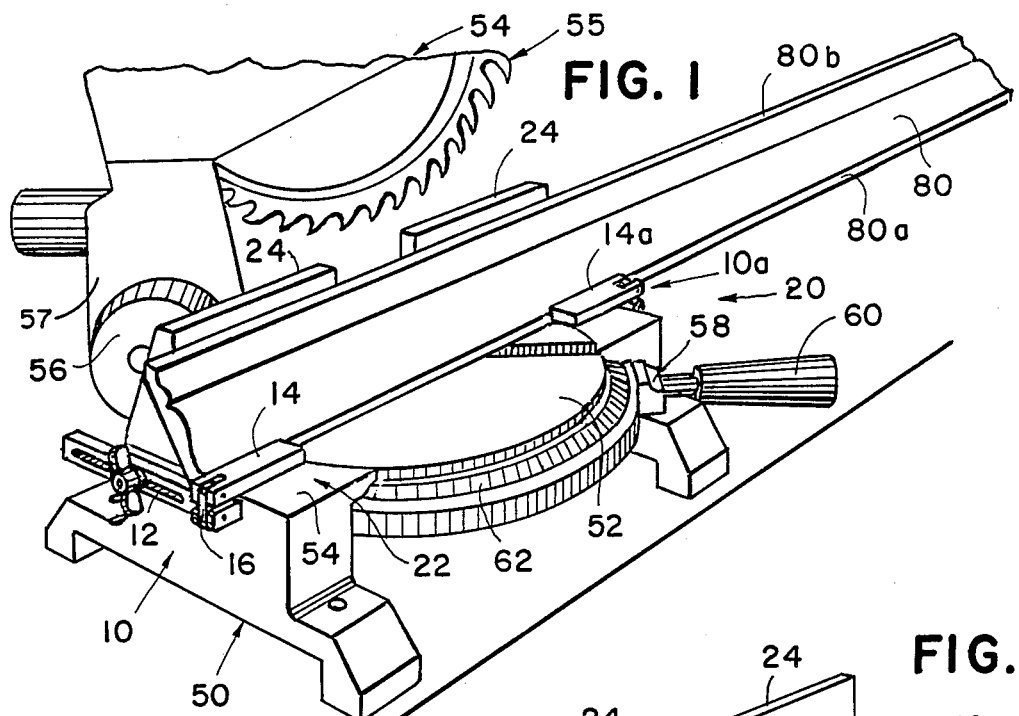
FIG. 1
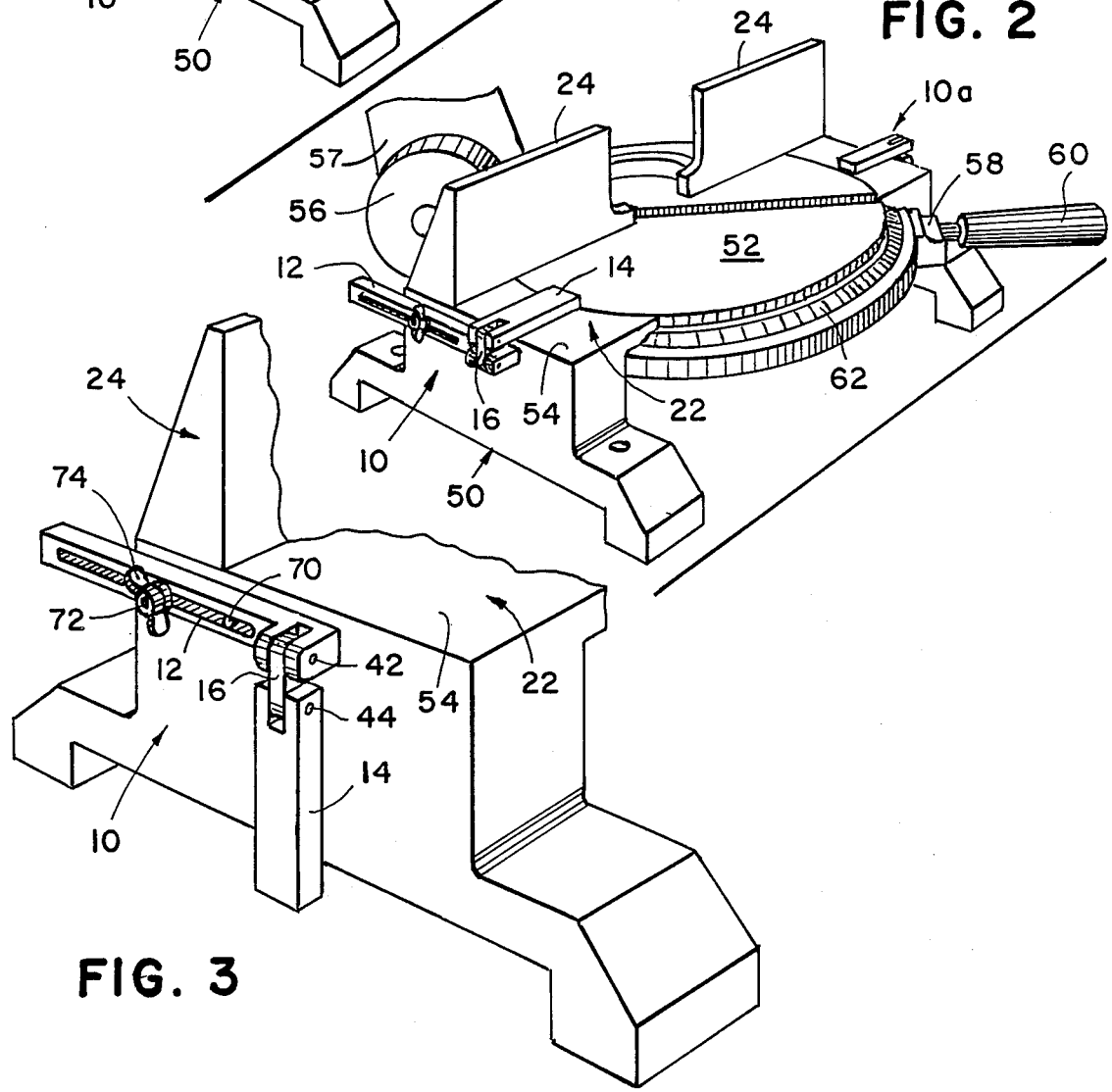
FIG. 2
FIG. 3

MITER BOX ATTACHMENT FOR CUTTING CROWN MOULDINGS AND THE LIKE

BACKGROUND OF THE INVENTION

The present invention relates to miter boxes, and more particularly to miter boxes adapted or modified to cut compound miters such as those for crown mouldings and the like.

A great many motorized miter boxes have been developed for cutting wood workpieces at precise angles to the longitudinal axis thereof. Such miter boxes include a work table for supporting the workpieces, a fence against which the workpieces may be registered, and a power saw reciprocable with respect to the work table to cut workpieces supported thereon. The work table and saw are angularly adjustable with respect to the fence so that angles other than right angles may be cut. Most often, 45 degree angles are used to form right angles between adjacent pieces of wood. One such exemplary motorized miter box is that sold as Model 1340238 by Delta International Machinery Corp. of Memphis, Tenn., the Instruction Manual for which is attached to the Disclosure Statement filed simultaneously herewith.

Although such miter boxes are well suited for cutting simple miters wherein the workpiece lays flat against the table and/or the fence, the boxes are not readily or easily adapted for cutting compound miters. A compound miter is created when a workpiece is cut at an angle to its longitudinal axis while no major planar surface of the workpiece abuts or is parallel to either the work table or the fence. Most typically, compound miters are cut in conjunction with crown mouldings and various frame mouldings.

Prior art methods for cutting compound miters are not without their drawbacks. Most often, filler blocks are mounted adjacent the work table and fence. The filler block provides a support surface oriented at an acute angle to both the work table and the fence, which is used as a reference or registration surface for the workpiece to be compound mitered. The filler blocks are typically secured to the fence or table, for example using bolts or screws. The filler blocks are therefore not readily installable or readily removable. Second, the filler blocks are rather bulky and therefore awkward and dangerous to handle in conjunction with the power saw. Third, the relatively permanent fixture of the filler block to the fence and/or table renders the saw unsuited for ready interchangeable use between simple miters and compound miters, requiring multiple miter boxes on a single job. Fourth, a separate set of filler blocks is required for each individual angle.

SUMMARY OF THE INVENTION

The aforementioned problems are overcome in the present invention wherein moveable fixtures are mounted on the work table for selectively permitting the alternate cutting of simple miters and adjustable compound miters. More specifically, each jig includes a body slidably attached to the work table to be movable toward and away from the fence and a registration block pivotally mounted with respect to the slide body. The registration blocks are moveable between an operative position laying on the work surface and an inoperative position below the work surface. When in the operative position, the blocks are a fixed distance from the fence, enabling a workpiece such as a crown moulding to be cocked between the registration blocks and the fence for cutting of the compound miter. When in the inoperative position, the registration blocks do not interfere with the free movement of articles on the work surface and therefore permit the saw to be used in a conventional manner. The position of the body block of each jig can be adjusted to provide variable spacing between the jig registration block and the fence. Such adjustment permits the alteration of the angle at which the workpiece is cocked and/or accommodates workpieces of varying widths.

The jigs of the present invention are easily installed on a miter box and enable the cutting of compound miters in a simple and efficient manner. When a compound miter is to be cut, the registration blocks are flipped onto the work surface of the miter box; and the distance between the registration blocks and the fence is easily adjusted using the slide fittings. At any time that the saw is used in a conventional manner, the registration blocks are pivoted to their inoperative position below the work surface leaving the work surface free of obstruction.

These and other objects, advantages, and features of the invention will be more readily understood and appreciated by reference to the detailed description of the preferred embodiment and the drawings.

BRIEF DESCRIPTION OF THE DRAWINGS

FIG. 1 is a fragmentary perspective view of a motorized miter box including the jig of the present invention supporting a crown moulding for the cutting of a compound miter;

FIG. 2 fragmentary perspective view similar to FIG. 1 with the crown moulding removed;

FIG. 3 an enlarged fragmentary perspective view of the present in the inoperative position;

DETAILED DESCRIPTION OF THE PREFERRED EMBODIMENT

Figure 4:
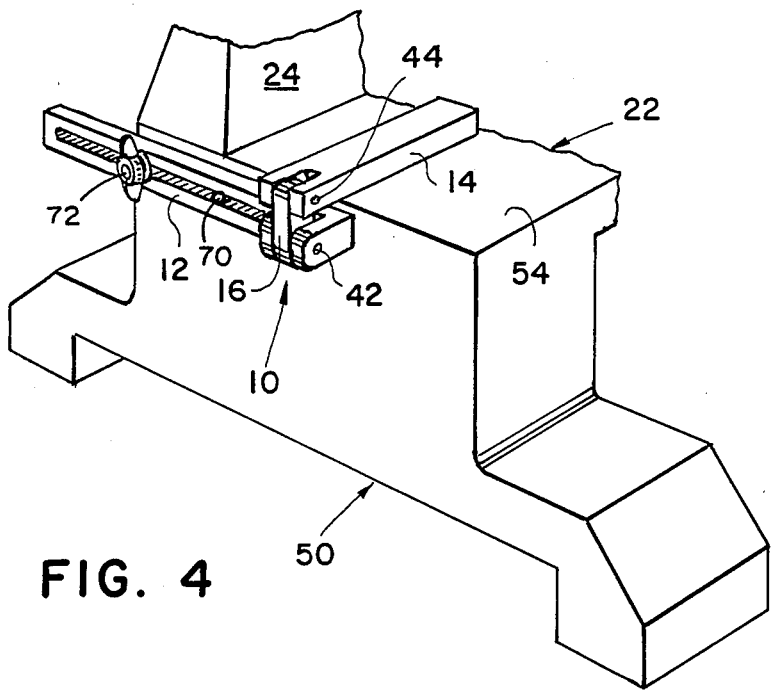
FIG. 4 is enlarged fragmentary perspective view of the present the operative position.

A jig for a motorized miter box is illustrated in the drawings and generally designated 10. Basically, the jig includes a slide block 12, a registration block 14, and a link 16 pivotally interconnecting these two pieces. The jig is mounted on a motorized miter box 20 having a horizontal work surface 22. The slide block 12 is mounted for sliding movement relative the work surface 22; and the registration block 14 can be pivoted between the operative position illustrated in FIGS. 1-2 and 4 and the inoperative position illustrated in FIG. 3. When in the operative position, the blocks 14 support the lower edge of a crown moulding 80 so that the crown moulding is cocked against the fence 24 of the miter box. In the inoperative position, the work surface 22 of the miter box is unobstructed (see FIG. 3).

One jig 10 and 10a is provided at the opposite lateral edges of the work surface. These two jigs are identical to one another; and consequently only jig 10 will be described in detail. As will be appreciated from the following description, the jigs are "unhanded" meaning that the jig can be mounted at either side of the work surface 22. All pieces of each jig 10 are preferably fabricated of 1020 steel and black-oxide finished. Of course, other suitable materials may be used to meet the application set forth in this description.

As perhaps best illustrated in FIGS. 5-10, the slide block 12 includes a slot-defining portion 30 and a bifurcated portion 32. The slot-defining portion 30 is a rectangular parallelepiped elongated along a first axis or direction and defines a slot 34 extending generally the full length of the portion 30. The slot 34 has a pair of rounded ends 34a and 34b and has a generally uniform height therebetween. The slot 34 extends entirely through the slot-defining portion 30. The bifurcated portion 32 is integral with the slot-defining portion 30 and defines a link-receiving slot 36 opening generally perpendicularly to the axis of the slide block 12.

The registration block 14 (FIGS. 5-10) is a rectangular parallelepiped elongated in an axis or direction generally perpendicular to that of the slide block 12. The registration block 14 includes a bifurcated end 38 defining a link-receiving slot 40. In the assembled jig, the slots 36 and 40 on the blocks 12 and 14, respectively, are generally aligned with one another permitting the link 16 to interfit therebetween.

The link 16 pivotally interconnects the slide block 12 and the registration block 14. More specifically, the link 16 is generally a rectangular parallelepiped having four rounded corners, although rounding is unnecessary. The link 16 includes two opposite ends 16a and 16b proximate the slide block 12 and the registration block 14, respectively. A pin 42 (see FIGS. 7 and 10) hingedly or pivotally interconnects the slide block 12 and the link 16. The pin 42 extends through both arms of the bifurcated portion 32 and the link 16. Similarly, the pin 44 (FIGS. 7 and 10) pivotally interconnects the registration block 14 and the link 16. The pin 44 extends through both arms of the bifurcated end 38 and the link 16 positioned therebetween. The pivot axes provided by the pins 42 and 44 are mutually distinct or separate and are generally parallel to the axis of the slide block 12. Consequently, the registration block 14 is free to pivot with respect to the slide block 12 in a plane generally perpendicular to the axes of the slide block.

The motorized miter box (FIGS. 1 and 2) is generally well known to those having ordinary skill in the art and will not be described herein in detail. One such suitable miter box is that sold as Model No. 1340238 by Delta International Machinery Corp. of Memphis, Tenn. The following motorized miter boxes are also believed to be equally suited to accommodate the present invention:

| Manufacturer | Model No. |
| --- | --- |
| Skil | 3810 |
| Black & Decker | 1703 |
| De Walt | 1707 |
| Makita | LS1020 (10") |
| | LS1430 (14") |
| Delta | 34-080 |
| Ryobi | TS251V (10") |

-continued

| Manufacturer | Model No. |
| --- | --- |
| | TS380 (14") |

Generally speaking, the motorized miter box includes a base 50 supporting a table 52 which in conjunction with the flat upper surfaces 54 of the base provide a horizontal planar work surface 22. A cutting head 54 including a saw blade 55 is mounted for vertical reciprocable movement with respect to the table 52. Other woodworking tools could also be substituted for the head 54. The head 54 is mounted on an arm assembly 57 which is pivotally supported on the table bracket 56 supported on the table 52. The table is pivotal in a horizontal plane with respect to the base 50 and is actuated using the control arm 58 and the table lock handle 60. A scale 62 is provided to indicate the angular orientation of the table and saw 54 with respect to the fence 24.

As best illustrated in FIGS. 3 and 4, the miter box 10 is easily modified to accept the jigs 10 by the addition of pins 70 and 72. Both pins are fixedly anchored within the base 50 and extend horizontally therefrom. A line drawn transversely through the two pins is horizontal and parallel to the work surface 22. The pin 70 is preferably smooth and extends a distance from the base 50 approximately equal to that of the width of the slide block 12 as viewed in FIG. 5. The pin 72 is threaded to receive a wing nut 74 to releasably secure the slide block in position.

The jig 10 is supported on the base 50 by slidably mounting the slide block 12 on the pins 70 and 72 with the pins extending through the slot 34. When so positioned, the slide block 12 lies adjacent the base 50 and is free to slide along a linear path toward and away from the fence 24. Preferably, the pins 70 and 72 are closely received within the slot 34 to prevent cocking or canting of the slide block 12 from the horizontal. The slide block 12 and consequently the jig 10 can be locked in a desired position by tightening the wing nut 74 on the pin 72.

Operation

Figure 5:
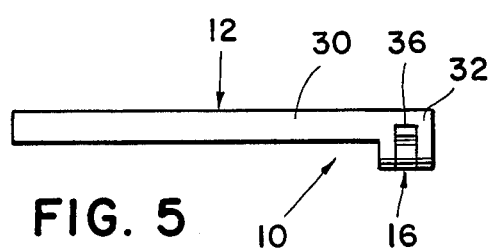
FIG. 5 top plan view of the jig in the inoperative position.
Figure 6:
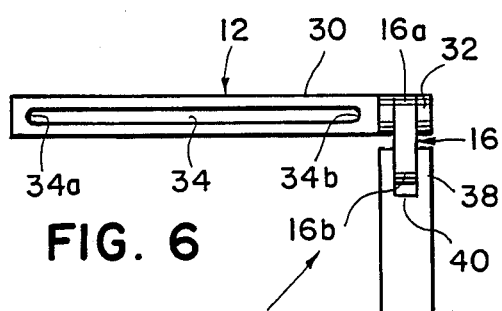
FIG. 6 a side elevational view of the jig in the inoperative position.
Figure 7:
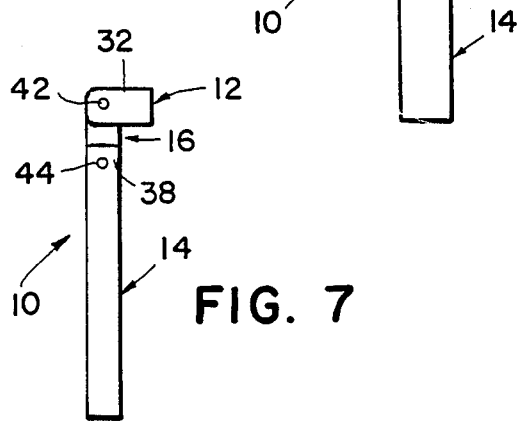
FIG. 7 is an end elevational view of the jig in the inoperative position.

The inoperative position of the jig 10 is illustrated in FIG. 3 (see also FIGS. 5-7). In this position, both the link 16 and the registration block 14 hang downwardly from the slide block 12. Consequently, all portions of the jig 10 are located below the work surface 22 of the saw 10. This permits the work surface to be freely used in a conventional manner without the jigs 10 interfering with any workpiece positioned on the work surface or extending from the work surface in a direction coplanar therewith.

Figure 8:
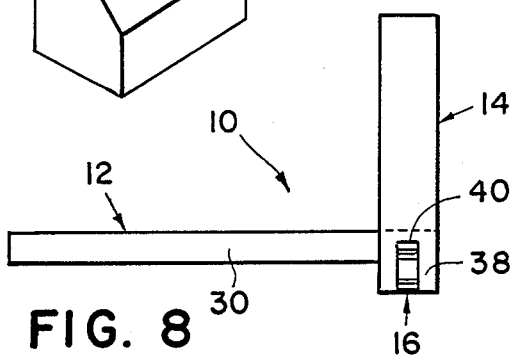
FIG. 8 is a top plan view of the jig in the operative position.
Figure 9:
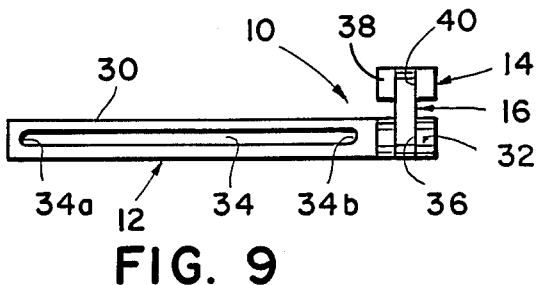
FIG. 9 side elevational view of the jig in the operative position.
Figure 10:
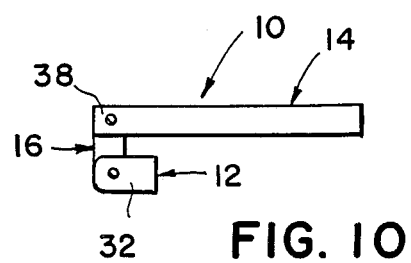
FIG. 10 is an end elevational view of the jig in the operative position.

The operative position of the jigs 10 is illustrated in FIGS. 1-2 and 4 (see also FIGS. 8-10). The registration block 14 is shifted from the inoperative position (FIG. 3) to the operative position (FIGS. 1-2) by simply flipping or moving the registration block 14 in a clockwise direction and the opposite registration block 14a in the opposite direction. When in the operative position, the elongated registration block 14 lies against the work surface 22 a distance from the fence 24. The link extends upwardly from the pivot axis 42 to the pivot axis 44 located directly thereabove. The link permits the registration block to lie essentially flat against the work surface 22 in the operative position and also substantially flat against the base 50 in the inoperative position.

The distance of the registration block 14 from the fence 24 can be adjusted by loosening the wing nut 74, positioning the slide block 12 as desired, and retightening the wing nut. The precise position of the registration blocks 14 will depend on the width of the material to be cut, the angle at which the material is to be held, and the desired angle of the resulting miter. The selection of these angles is generally well known to those having ordinary skill in the art.

As illustrated in FIG. 1, a crown moulding 80 is held in a cocked position between the registration blocks 14 and 14a and the fence 24. More particularly, the lower edge 80a of the crown moulding rests on the work surface 22 abutting the registration blocks 14; and the opposite edge 80b rests against the fence 24. When the distance between the registration blocks 14 and the fence 24 is less than the width of the crown moulding or other workpiece to be cut, the crown moulding will be held at a cocked angle from the horizontal. While the crown moulding is held down in the cocked position by the operator, the cutting head 54 is operated to cut the compound miter.

Sequential compound miters of different angles and/or different width materials can be easily cut simply by repositioning the jigs 10. Further, simple and compound miters can be easily sequentially cut by pivoting the registration blocks between the inoperative and operative positions. This greatly facilitates use of the saw by multiple users on a single job to reduce the number of saws required on a job.

The above embodiment is that of a preferred aspect of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. A motorized miter box for cutting compound miters comprising:
   a horizontal table having a planar surface for supporting a workpiece;
   a fence extending upwardly from said table to provide a registration surface for a workpiece supported on said table;
   a saw for cutting a workpiece supported on said table and registered against said fence;
   a pair of jigs mounted at opposite edge portions of said table, each of said jigs including a body and a registration block pivotally secured to said body, said body being located below said upper surface of said table, said registration block being pivotable between a storage position wherein said registration block is also located below said upper surface of said table and an operative position wherein said registration block rests on said upper surface to define a distance between said registration block and said fence so that a workpiece can be held in cocked position between said registration block and said fence; and
   mounting means for mounting each of said jig bodies below said upper surface of said table, said mounting means permitting relative movement between said jig body and said table so that said registration block can be moved toward and away from said fence, whereby the distance between said registration blocks and said fence is adjustable.

2. A motorized miter box as defined in claim 1 wherein each of said jig bodies is slidably mounted on said table.

3. A motorized miter box as defined in claim 2 wherein said mounting means comprises:
   a pair of pins extending from said table; and
   said body defining an elongated slot receiving said pins, said slot being longer than the distance between said pins, whereby said body can be slid on said pins.

4. A motorized miter box as defined in claim 1 wherein each of said jigs further includes a link pivotally secured to said body and to said registration block about separate pivot axes, said link being located partially above and partially below said upper surface of said work table when said registration block is in the operative position, said link being located entirely below said upper surface when said registration block is in the storage position.

5. A woodworking machine jig comprising:
   a body member defining a slot elongated in a first direction;
   a registration member; and
   a pivot member pivotally connected to both of said body member and said registration member about mutually distinct pivot axes, both of said axes being parallel to the first direction, whereby said registration member pivots about said body member in a plane perpendicular to the first direction.

6. A woodworking machine jig as defined in claim 5 wherein said registration member is elongated in a second direction perpendicular to the first direction.

7. A machine comprising:
   planar support means for defining a planar work surface for supporting a work piece;
   implement means for working a work piece supported on said support means;
   fence means extending from said work surface for orienting a work piece positioned on said work surface with respect to said implement means; and
   jig means for supporting a work piece in a cocked position against said fence, said jig means including a registration member movable between an operative position above said work surface a desired distance from said fence means wherein a work piece supported on said work surface abutting said registration member will be held in cocked position against said fence means and an inoperative position wherein said registration member is located below said work surface thereby leaving said work surface unobstructed so that work pieces laying on said work surface and extending therefrom will not engage said jig means, said jig means further including mounting means for mounting said jig means for movement relative to said fence means enabling the distance between said jig means and said fence means to be adjusted, said mounting means being located below said planar work surface, said registration member being movably secured to said mounting means.

8. A woodworking machine as defined in claim 7 wherein said registration member is pivotally secured with respect to said mounting means.

9. A woodworking machine as defined in claim 7 wherein said mounting means includes means for slidably mounting said jig means with respect to said support means.

10. A woodworking machine as defined in claim 7 comprising a pair of said jig means.

11. A woodworking machine comprising:
    planar support means for supporting a piece of wood;
    implement means for working a piece of wood supported on said support means;
    fence means extending from said support means for orienting a piece of wood positioned on said support means with respect to said implement means; and
    jig means for supporting a piece of wood in a cocked position against said fence, said jig means being movable between an operative position above said planar support means a desired distance from said fence means wherein a piece of wood supported on said support means abutting said jig means will be held in cocked position against said fence means, and an inoperative position wherein said jig means leaves said support surface unobstructed so that pieces of wood laying on said support means and extending therefrom will not engage said jig means, said jig means comprising:
    a body mounted for movement with respect to said planar surface;
    a link pivotably mounted to said body about a first pivot axis;
    a registration member pivotally mounted to said link about a second pivot axis, both pivot axes being parallel to said support surface, said registration member located above said support means in an operative position and below said support means in an inoperative position.

12. A woodworking machine comprising:
    a table defining a horizontal, planar work surface;
    a powered implement reciprocable with respected to said work surface;
    a fence extending upwardly from said word surface; and
    jig means for supporting a workpiece in cocked position against said fence, said jig means including a registration block movable between an operative position above said work surface and spaced from said fence and an inoperative position wherein said registration block is located below said work surface, said jig means further including a body releasably secured to said table below said work surface, said registration block being movably mounted with respect to said body, said jig means further including adjustment means for moving said jig body and registration block relative to said fence among a plurality of positions along a path, said adjustment means including securing means for securing said jig body in a selected one of the positions.

13. A woodworking machine as defined in claim 12 wherein said jig means is mounted for sliding movement relative to said fence.

14. A woodworking machine as defined in claim 12 wherein said registration block is pivotally mounted with respect to said jig body.

15. A woodworking machine as defined in claim 12 comprising a pair of said jig means.

16. A woodworking machine comprising:
    a horizontal, planar work surface;
    a powered implement reciprocable with respect to said work surface;
    a fence extending upwardly from said work surface; and
    jig means for supporting a workpiece in cocked position against said fence, said jig including a registration block above said work surface and spaced from said fence, said jig further including adjustment means for moving said registration block relative said fence among a plurality of positions, said adjustment means including securing means for securing said adjustment means in a selected one of the positions, said registration block being movable between an operative position wherein said registration block is located above said work surface and an inoperative position wherein said registration block is located below said work surface, said jig means further including a body releasably block secured with respect to said work surface, said registration block being pivotally mounted with respect to said body, said jig means further including a link pivotally interconnected to said registration block and said body about first and second pivot axes, respectively, said first and second pivot axes being parallel to said planar work surface.

* * * * *

UNITED STATES PATENT AND TRADEMARK OFFICE
CERTIFICATE OF CORRECTION

PATENT NO. : 4,875,399

DATED : October 24, 1989

INVENTOR(S) : William D. Scott et al

It is certified that error appears in the above-identified patent and that said Letters Patent is hereby corrected as shown below:

Column 8, Line 39
"block secured" should be --secured--.

Signed and Sealed this

Twenty-fifth Day of September, 1990

Attest:

HARRY F. MANBECK, JR.

*Attesting Officer*    *Commissioner of Patents and Trademarks*